FERRITE CORE HAVING DIFFERENT REGIONS OF VARYING PERMEABILITY

Filed Sept. 1, 1964

INVENTORS
GEORGE G. PICK
ALLAN W. SNYDER
BY Spencer E. Olson
ATTORNEY

United States Patent Office 3,417,382

Patented Dec. 17, 1968

3,417,382

FERRITE CORE HAVING DIFFERENT REGIONS OF VARYING PERMEABILITY

Allan W. Snyder, Waltham, and George G. Pick, Lexington, Mass., assignors to Sylvania Electric Products Inc., a corporation of Delaware Filed Sept. 1, 1964, Ser. No. 393,524
5 Claims. (Cl. 340—174)

ABSTRACT OF THE DISCLOSURE

A solenoid having a ferrite core in which the permeability of the two end sections is higher than that of the central section.

This invention relates to memory systems and more particularly to improved magnetic elements therefor.

A memory system has been disclosed in copending applications Ser. No. 163,451, filed Jan. 2, 1962, and Ser. No. 334,413, filed Dec. 30, 1963, now Patent Number 3,299,412, and assigned to the assignee of the present application, wherein an array of solenoids is employed in conjunction with a plurality of thin planes containing stored data to provide a permanent, mechanically changeable, random access memory. This memory is especially useful for retaining stored computer programs, and for pattern recognition systems. The memory system itself is described in detail in the above-identified copending applications, and so will be described here only insofar as necessary to understand the present invention.

In brief, data is stored on a thin plane of plastic material by means of printed conductive paths which either surround or by-pass selected holes in the plane. The surrounding paths represent "ONES" while the by-pass paths represent "ZEROS." Data words can therefore be represented in binary form by a suitably configured conductive path. An array of solenoids passes through corresponding holes in the plane, and selected solenoids are energized to magnetically couple the conductive paths surrounding the energized solenoids to thereby induce a voltage in the conductive paths which is representative of the data stored on the plane. In like manner, other data is stored on other planes which are also positioned over the solenoids. Each plane has a conductive path which is unique to a particular group of solenoids; thus, by addressing a particular group of solenoids, the data stored on the corresponding plane can be read out. A major advantage of this memory system is that data planes need not be precisely aligned with each other or with the solenoids, and the planes can be easily changed by removing them from the solenoid array and inserting new ones. Each plane having a unique address, a particular plane can be properly addressed without regard to its position along the length of the solenoid. The solenoid array can also be used to couple data from the planes, rather than for addressing them. In this regard, a plane containing certain encoded data is interrogated by an appropriate signal and the data coupled to selected solenoids which correspond to the coded data.

For optimum operation, it is desirable that the magnetic field along the length of the solenoid be uniform so that voltages induced in planes located at different positions along the length of the solenoid are of equal amplitude. Signals which vary appreciably in amplitude depending upon the position of the planes would greatly complicate the logic circuitry necessary to decode the data content of the planes. Heretofore, air-core solenoids have been used to provide a uniform magnetic field along the length of the solenoid, and hence uniform coupling to the data planes. A solenoid and its associated surrounding conductive path is, in essence, a transformer with the solenoid being the primary winding and the conductive path being the secondary winding. Air-core solenoids have low self-inductance for a given number of turns, which limits the magnitude of the magnetic field, and hence the signal that can be coupled to the planes. To produce a magnetic field of usable magnitude using practical amounts of energizing power, the number of turns wound around the air core must be increased; however, the step-down ratio between the solenoid winding and the single loop conductive path is now very large, with consequent decrease in the amplitude of the voltage coupled to the conductive path. These voltages are often too small to be useful to drive the associated circuitry. It would appear that the magnetic field strength could be enhanced by the use of a magnetic core material such as a ferrite, but, unfortunately, the magnetic field strength along the length of a magnetic core solenoid is not uniform, being greatest at the center of the solenoid and decreasing toward each end due to flux leakage at the ends of the solenoid. Coupling from the solenoids to the data planes is, therefore, non-uniform, causing wide variation in the magnitudes of the voltages induced in the planes. The voltage induced in the conductive paths on a particular coded plane would then vary depending on the position of the plane along the length of the solenoid. Moreover, the induced voltages on some of the planes are too small to insure reliable memory operation. It is, therefore, an object of the present invention to provide an improved solenoid having a strong, uniform magnetic field which produces uniform coupling along its entire length.

Briefly, the invention comprises a solenoid having a ferrite core in which the permeability of the end portions of the core is higher than the permeability of the central portion.

The foregoing, together with other objects, features and advantages of the invention will be better understood from the following detailed description, taken in conjunction with the drawings in which.

Figure 1:
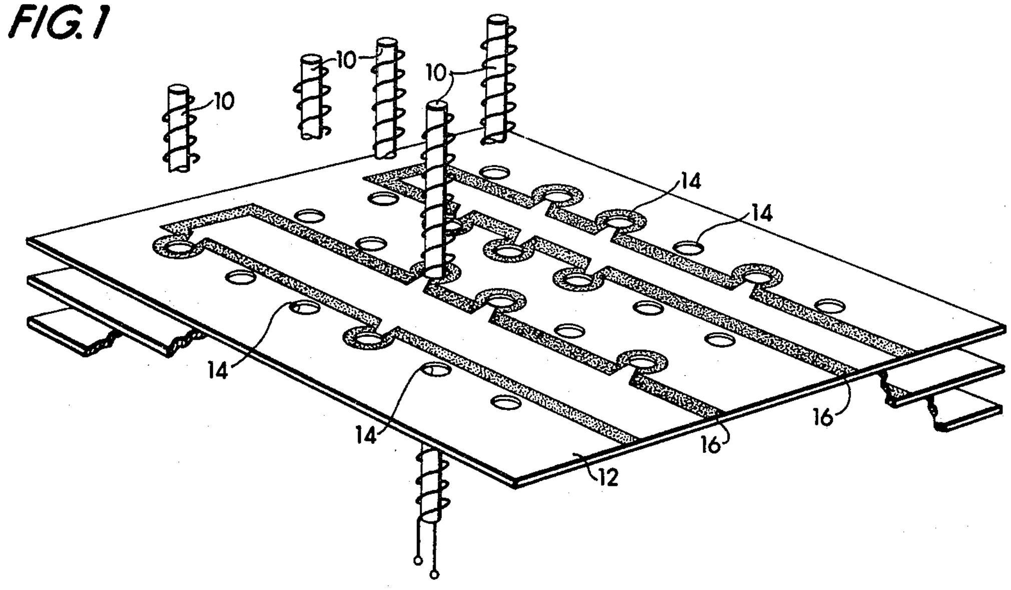
FIG. 1 is a pictorial view, partly broken away, of a memory system which employs the present invention.

A memory system in which the present invention is employed is shown in FIG. 1, and includes an array of elongated solenoids 10 which pass through a plurality of thin plastic planes 12, each having a plurality of holes 14 corresponding in position to the solenoid array. The planes are fabricated, for example, from Mylar plastic sheet. Each plane has a conductive path 16, formed, for example, by well known printed circuit techniques, which encircle certain of the holes and by-pass certain others to provide a means of representing coded data. The encircled holes represent "ONES," while the by-passed holes represent "ZEROS." Binary words are represented by arranging conductive path 16 to encircle or by-pass the proper holes to correctly encode the bits of a data word.

In operation, the solenoids 10 corresponding to a particular coded plane are energized causing a voltage to be coupled to the conductive path associated with this plane. An output signal from this conductive path, taken from respective ends of conductive path 16, is representative of the coded data which has been addressed. Each data plane has a unique address and can be selected regardless of its position along the length of the solenoid array. To insure correct addressing of the planes, the amplitude of the voltages induced in the various planes should be uniform, regardless of the position of the plane along the length of the solenoids. This requires the magnetic field along the length of the solenoid to be uniform so that voltages of equal amplitude will be induced in a plane regardless of its location in the stack.

It has been discovered that the magnetic field can be made uniform along the length of the solenoid by employing a mangetic core having different permeabilities along its length. The central portion of the core is a material having a lower permeability than that of the material forming the end portions of the core. The increased permeability of the end portions decrease the reluctance of these portions of the solenoid which causes relatively more flux to pass through the end portions of the solenoid with respect to the central portion. The resulting magnetic field is then of uniform strength along the length of the solenoid.

Figure 2:
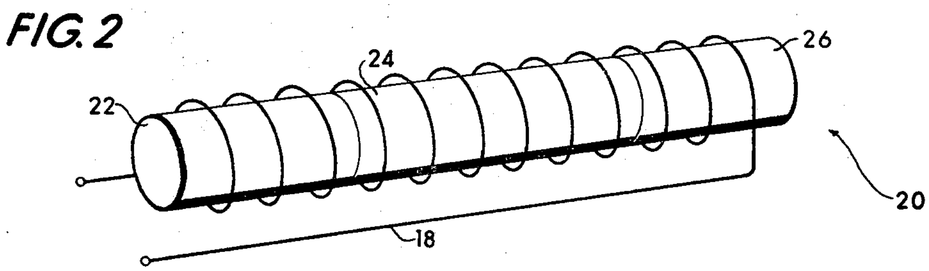
FIG. 2 is a pictorial view of a solenoid constructed according to the invention.
Figure 3:
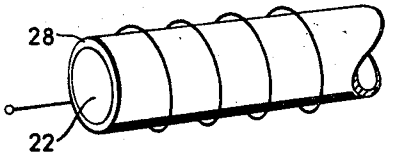
FIG. 3 is a pictorial view, partly broken away, of another embodiment of the invention.

A solenoid constructed according to the invention is shown in FIG. 2 and includes a coil 18 uniformly wound with constant pitch over a ferrite core 20 having three sections 22, 24 and 26. The end sections 22 and 26 are of higher permeability than that of the center section 24. The relative permeabilities are chosen to provide a magnetic field of uniform strength along the length of the solenoid. As an example, relative permeabilities of 800 and 125 have been found satisfactory in practice. The dimensions of the solenoid are chosen to suit the operating characteristics required by the particular case. It has been found that a center section twice the length of the end sections provide substantially uniform coupling. For example, solenoids have been constructed and employed in a memory system of the type described above, each having a core formed of a three-inch long center portion with a permeability of 125, and a pair of one and one-half inch long end sections each with a permeability of 800. The core sections may be cemented together or may be contained in a paper or other non-conductive tube 28, shown in FIG. 3, over which the coil is wound. If the ferrite sections are not cemented together, small air gaps may exist between abutting ends of the sections, but these air gaps do not adversely affect performance since the reluctance of the gaps is small compared to the high reluctance of the solenoid return path. Since ferrite materials are fragile, the embodiment of FIG. 3 would be more suitable under practical operating conditions.

From the foregoing, it is evident that a simple magnetic element has been provided which can produce a strong, uniform magnetic field along its entire length. A particular data plane will, therefore, have a voltage of constant magnitude induced therein without regard to the position of the plane along the length of the solenoid. Reliable memory operation is thereby assured. The scope of the invention is not to be limited to what has been particularly shown and described except as indicated in the appended claims.

What is claimed is:

1. For a memory system which includes a plurality of thin planes stacked one upon the other each containing unique data; a plurality of elongated solenoids passing through said planes, each of said solenoids comprising a ferrite core having a central portion of a lower permeability and end portions of a higher permeability, and a coil of wire helically wound with constant pitch around said ferrite core whereby a uniform magnetic field is established along the length of said solenoid.

2. For a memory system which includes a plurality of thin planes stacked one upon the other containing unique data; a plurality of elongated solenoids passing through said planes, each of said solenoids comprising an elongated ferrite core of circular cross section and having first and second end sections of one permeability and a central section of another permeability, said central section being of lower permeability than said end sections, and a core of wire helically wound with constant pitch around said ferrite core whereby a uniform magnetic field is established along the length of said solenoid.

3. For a memory system which includes a plurality of thin plastic planes containing a plurality of holes, said planes being stacked one upon the other, each plane having printed conductive paths which either surround or by-pass selected holes in the plane to define data unique thereto; a plurality of elongated solenoids passing through the hole in said planes in coupling relation therewith, each of said solenoids comprising an elongated ferrite core of circular cross section and having first and second end sections of one permeability and a central section of another permeability, said central section being of lower permeability than said end sections, and a coil of wire helically wound with constant pitch around said ferrite core whereby a uniform magnetic field is established along the length of said solenoid.

4. For a memory system which includes a plurality of thin plastic planes containing a plurality of holes, said planes being stacked one upon the other, each plane having printed conductive paths which either surround or by-pass selected holes in the plane to define data unique thereto; a plurality of elongated solenoids passing through the holes in said planes in coupling relation therewith, each of said solenoids comprising a cylindrical non-conductive tube, an elongated ferrite core of circular cross section contained within and being coextensive with said cylindrical tube, said ferrite core having first and second end sections of one permeability and a central section of another permeability, said central section being of lower permeability than said end sections, and a coil of wire helically wound with constant pitch around said cylindrical tube whereby a uniform magnetic field is established along the length of said solenoid to couple voltages of uniform amplitude to said planes.

5. A solenoid comprising an elongated ferrite core of circular cross section and having first and second end sections of higher permeability and a central section of lower permeability, said lower and higher permeabilities differing by an amount to produce a uniform magnetic field along the length of said solenoid, and a coil of wire helically wound with constant pitch around said ferrite core.

References Cited

UNITED STATES PATENTS

| | | | |
|---|---|---|---|
| 3,290,512 | 5/1966 | Tillman et al. | 340—174 |
| 3,319,234 | 5/1967 | Brette | 340—174 |
| 3,092,813 | 6/1963 | Broadbent | 340—174 |
| 3,067,408 | 12/1962 | Barrett | 340—174 |
| 3,094,626 | 6/1963 | Brewster | 307—88 |
| 3,140,471 | 7/1964 | Fuller | 340—174 |
| 3,140,403 | 7/1964 | Morwald | 307—88 |
| 3,217,103 | 11/1965 | Lien | 340—174 X |
| 3,341,830 | 9/1967 | Conrath | 340—174 |

STANLEY M. URYNOWICZ, Jr., *Primary Examiner.*

U.S. Cl. X.R.

336—221